United States Patent
Liu et al.

(10) Patent No.: US 8,733,339 B2
(45) Date of Patent: May 27, 2014

(54) SOLAR COLLECTOR AND SOLAR HEATING SYSTEM USING SAME

(75) Inventors: Peng Liu, Beijing (CN); Pi-Jin Chen, Beijing (CN); Liang Liu, Beijing (CN); Kai-Li Jiang, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 561 days.

(21) Appl. No.: 12/381,578

(22) Filed: Mar. 12, 2009

(65) Prior Publication Data

US 2010/0065043 A1 Mar. 18, 2010

(30) Foreign Application Priority Data

Apr. 18, 2008 (CN) .......................... 2008 1 0066751

(51) Int. Cl.
*F24J 2/22* (2006.01)
(52) U.S. Cl.
USPC ............ 126/654; 126/584; 136/200; 136/248
(58) Field of Classification Search
USPC ......................... 126/655, 684, 707, 708, 654
See application file for complete search history.

(56) References Cited

U.S. PATENT DOCUMENTS

| | | | | |
|---|---|---|---|---|
| 3,303,838 A | * | 2/1967 | Thomason | 126/634 |
| 3,953,110 A | * | 4/1976 | Charoudi | 359/227 |
| 3,974,822 A | * | 8/1976 | Patil | 126/708 |
| 3,981,293 A | * | 9/1976 | Gillery | 126/648 |
| 4,003,363 A | * | 1/1977 | Grossman | 126/661 |
| 4,065,593 A | * | 12/1977 | Peterson | 428/92 |
| 4,074,482 A | * | 2/1978 | Klahr | 52/171.3 |
| 4,080,957 A | * | 3/1978 | Bennett | 126/636 |
| 4,091,793 A | * | 5/1978 | Hermann et al. | 126/648 |
| 4,097,308 A | * | 6/1978 | Klein et al. | 136/251 |
| 4,159,706 A | | 7/1979 | Mahdjuri | |
| 4,183,352 A | * | 1/1980 | Spencer | 126/646 |
| 4,279,243 A | * | 7/1981 | Deakin | 126/709 |
| 4,282,856 A | * | 8/1981 | Stehl et al. | 126/706 |

(Continued)

FOREIGN PATENT DOCUMENTS

| | | |
|---|---|---|
| CN | 2302262 | 12/1998 |
| CN | 2457521 Y | 10/2001 |

(Continued)

OTHER PUBLICATIONS

Sarah Graham, Carbon Nanotubes for Solar Cells, Sep. 15, 2003, Scientific American, http://www.scientificamerican.com/article.cfm?id=carbon-nanotubes-for-sola, entire article.*

(Continued)

*Primary Examiner* — Jorge Pereiro
(74) *Attorney, Agent, or Firm* — Novak Druce Connolly Bove + Quigg LLP

(57) ABSTRACT

A solar collector includes a substrate having a top surface and a bottom surface opposite to the upper surface, a sidewall, a transparent cover, and a heat-absorbing layer. The sidewall is arranged on the top surface of the substrate. A transparent cover is disposed on the sidewall opposite to the substrate to form a sealed chamber with the substrate together. The heat-absorbing layer is disposed on the upper surface of the substrate and includes a carbon nanotube composite material.

14 Claims, 3 Drawing Sheets

(56) References Cited

U.S. PATENT DOCUMENTS

| | | | | |
|---|---|---|---|---|
| 4,414,958 A | * | 11/1983 | Hozumi et al. | 126/708 |
| 4,569,330 A | * | 2/1986 | Pettersson | 126/570 |
| 4,587,376 A | * | 5/1986 | Kosaka et al. | 136/248 |
| 4,596,237 A | * | 6/1986 | Melchior et al. | 126/618 |
| 4,803,972 A | * | 2/1989 | Janson | 126/710 |
| 4,822,120 A | | 4/1989 | Fan et al. | |
| 4,949,704 A | * | 8/1990 | Pfluger | 126/594 |
| 5,092,101 A | * | 3/1992 | Kunert | 52/786.11 |
| 5,653,222 A | * | 8/1997 | Newman | 126/653 |
| 5,965,231 A | * | 10/1999 | Rotermund et al. | 428/69 |
| 6,158,612 A | * | 12/2000 | Alpert | 220/739 |
| 6,407,922 B1 | * | 6/2002 | Eckblad et al. | 361/704 |
| 7,183,003 B2 | | 2/2007 | Leu et al. | |
| 7,323,730 B2 | * | 1/2008 | Borghetti et al. | 257/290 |
| 7,541,623 B2 | * | 6/2009 | Yi et al. | 257/98 |
| 7,608,293 B2 | | 10/2009 | Huang et al. | |
| 2005/0002849 A1 | | 1/2005 | Mitsui et al. | |
| 2005/0069701 A1 | | 3/2005 | Watanabe et al. | |
| 2005/0095938 A1 | | 5/2005 | Rosenberger et al. | |
| 2005/0194035 A1 | * | 9/2005 | Jin et al. | 136/252 |
| 2006/0048808 A1 | | 3/2006 | Ruckman et al. | |
| 2006/0055392 A1 | * | 3/2006 | Passmore et al. | 324/71.1 |
| 2006/0134326 A1 | * | 6/2006 | Watanabe et al. | 427/180 |
| 2006/0137741 A1 | * | 6/2006 | Park et al. | 136/263 |
| 2006/0155043 A1 | * | 7/2006 | Johnson et al. | 524/495 |
| 2006/0186502 A1 | * | 8/2006 | Shimotani et al. | 257/458 |
| 2006/0189018 A1 | * | 8/2006 | Yi et al. | 438/47 |
| 2007/0051965 A1 | | 3/2007 | Du et al. | |
| 2007/0084460 A1 | * | 4/2007 | Beckman | 126/625 |
| 2007/0107771 A1 | * | 5/2007 | Tempesta | 136/252 |
| 2008/0049380 A1 | | 2/2008 | Miyahara et al. | |
| 2008/0110486 A1 | * | 5/2008 | Tsakalakos et al. | 136/244 |
| 2008/0110494 A1 | * | 5/2008 | Reddy | 136/255 |
| 2008/0135089 A1 | * | 6/2008 | Tsakalakos et al. | 136/248 |
| 2008/0169061 A1 | * | 7/2008 | Tour et al. | 156/275.5 |
| 2008/0178920 A1 | | 7/2008 | Ullo | |
| 2008/0248235 A1 | | 10/2008 | Feng et al. | |
| 2009/0108252 A1 | * | 4/2009 | Banerjee et al. | 257/14 |
| 2009/0194147 A1 | * | 8/2009 | Grommesh et al. | 136/251 |
| 2010/0101624 A1 | * | 4/2010 | Fioretti et al. | 136/244 |
| 2010/0236543 A1 | | 9/2010 | Oetting et al. | |

FOREIGN PATENT DOCUMENTS

| | | |
|---|---|---|
| CN | 2486079 | 4/2002 |
| CN | 1474113 | 2/2004 |
| CN | 2641536 Y | 9/2004 |
| CN | 201014777 Y | 1/2008 |
| CN | 101239712 | 8/2008 |
| DE | 19704323 | 7/1998 |
| DE | 102006039804 | 2/2008 |
| EP | 1529857 | 5/2005 |
| JP | 52-116942 | 9/1977 |
| JP | 57-92654 | 6/1982 |
| JP | 58-52932 | 3/1983 |
| JP | S58-52932 | 3/1983 |
| JP | 62-59342 | 3/1987 |
| JP | 5-79708 | 3/1993 |
| JP | 2001-226108 | 8/2001 |
| JP | 2003-160322 | 6/2003 |
| JP | 2004-211718 | 7/2004 |
| JP | 2005-96055 | 4/2005 |
| JP | 2005-199666 | 7/2005 |
| JP | 2005199666 | 7/2005 |
| JP | 2006-1820 | 1/2006 |
| JP | 2006114826 | 4/2006 |
| JP | 2006-229168 | 8/2006 |
| JP | 2006-265079 | 10/2006 |
| JP | 2007-27088 | 2/2007 |
| JP | 2007-183252 | 7/2007 |
| JP | 2008-44820 | 2/2008 |
| JP | 2009-141079 | 6/2009 |
| TW | I253467 | 4/2006 |
| TW | 200639119 | 11/2006 |
| TW | I282326 | 7/2012 |
| WO | WO2007015670 | 2/2007 |

OTHER PUBLICATIONS

Liang Jintao, Liu Junhua, Optimization of a IR detector of Microcantilever with Carbon Nanometer Tube, Acta Optica Sinica, Nov. 2004, pp. 1547-1551, vol. 24 No. 11.

Zhu et al., Carbon Nanometer Tube, China Machine Press, Jan. 2003, pp. 195-198.

Xiao-gang Sun, "Investigation on Radar Absorbing Properties of Carbon Nanotube", Journal of Synthetic Crystals, Feb. 2005, vol. 34, No. 1, p. 174-177 (Wherein, abstract maybe relevant).

* cited by examiner

SOLAR COLLECTOR AND SOLAR HEATING SYSTEM USING SAME

This application is related to applications entitled, "SOLAR COLLECTOR", filed Mar. 12, 2009 Ser. No. 12/381,577; "SOLAR COLLECTOR", filed Mar. 12, 2009 Ser. No. 12/3812,611; "SOLAR COLLECTOR", filed Mar. 12, 2009 Ser. No. 12/381,551; AND "SOLAR COLLECTOR", filed Mar. 12, 2009 Ser. No. 12/381,579. The disclosures of the above-identified applications are incorporated herein by reference.

BACKGROUND

1. Technical Field

The present disclosure relates to a solar collector and, particularly, to a solar collector incorporating carbon nanotubes.

2. Discussion of Related Art

Generally, solar collectors can be divided into two typical types: pipe solar collectors and flat plate solar collectors. For many applications, it has been demonstrated that the most efficient and least expensive type of solar collector is the flat plate collector. Referring to FIG. 3, a typical flat plate collector 500, according to the prior art, includes a substrate 52, a sidewall 56 arranged on the periphery of the substrate 52, and a transparent cover 50 fixed on the sidewall 56 opposite to the substrate 52. A sealed chamber 60 is formed between the substrate 52 and the transparent cover 50. A number of supporters 58 are dispersed in the sealed chamber 60 at random. The transparent cover 50 is used for passage of light and is made of glass, plastic and other transparent materials. The substrate 52 is made of absorbing materials, such as copper, aluminum, or the likes. In use, the light enters the collector 500 through the cover 50, and is absorbed by the substrate 52. Thus, heat is generated by the substrate 52 and is transferred to a storage apparatus (not shown).

Actually, the traditional thin films made of absorbing materials have very high absorbing efficiency. The traditional solar collector 500 can't adopt the thin film technology because the film is difficult to evaporate on the large area substrate. As such, the heat absorbing efficiency of the solar collector 500 is limited by the material it used. Therefore, the efficiency of the collector 500 is limited accordingly.

What is needed, therefore, is to provide a solar collector and a solar heating system using the solar collector that can overcome the above-described shortcomings.

BRIEF DESCRIPTION OF THE DRAWINGS

Many aspects of the present solar collector can be better understood with references to the following drawings. The components in the drawings are not necessarily drawn to scale, the emphasis instead being placed upon clearly illustrating the principles of the present solar collector.

Figure 1:
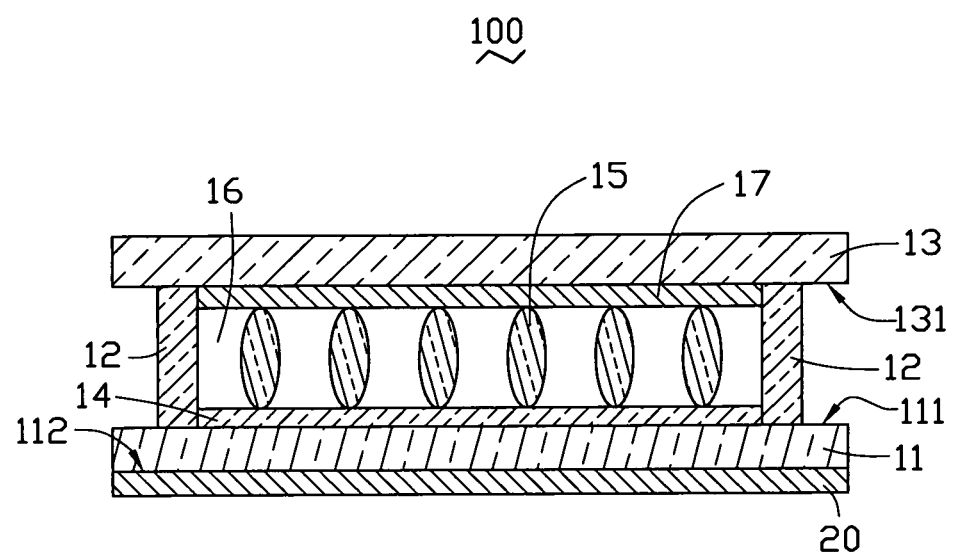
FIG. 1 is a schematic, side view of a solar collector having a carbon nanotube composite material in accordance with the present embodiment.

Corresponding reference characters indicate corresponding parts throughout the several views. The exemplifications set out herein illustrate at least one embodiment of the solar collector and the solar heating system using same, in at least one form, and such exemplifications are not to be construed as limiting the scope of the invention in any manner.

DETAILED DESCRIPTION OF EXEMPLARY EMBODIMENTS

References will now be made to the drawings to describe, in detail, embodiments of the solar collector.

Figure 2:
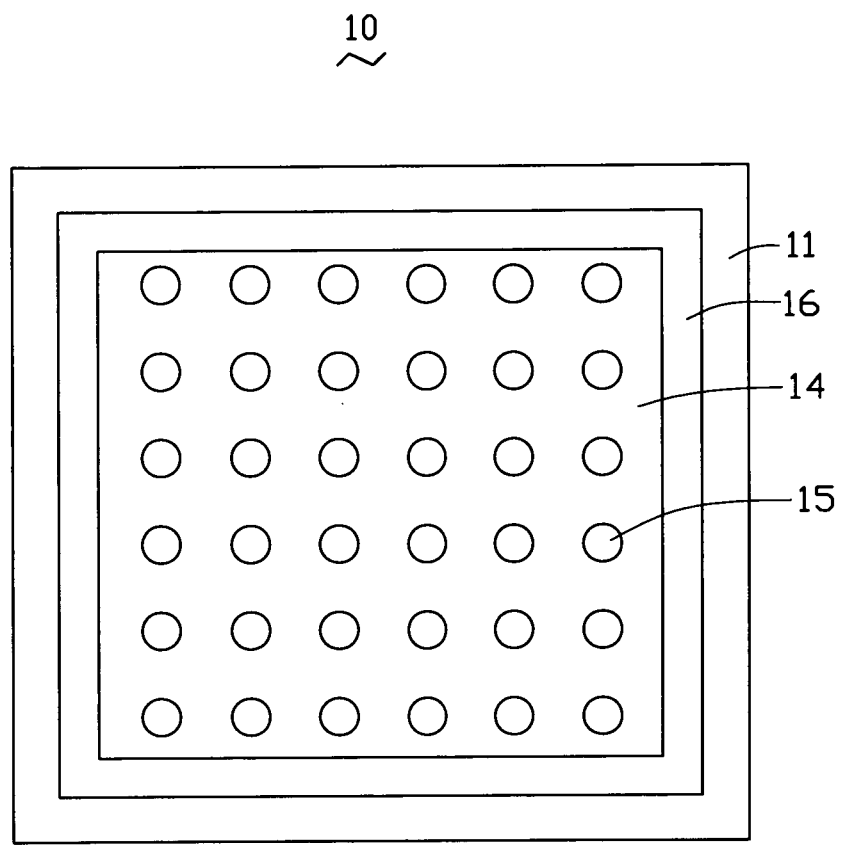
FIG. 2 is a schematic, top view of a solar collector of FIG. 1.
Figure 3:
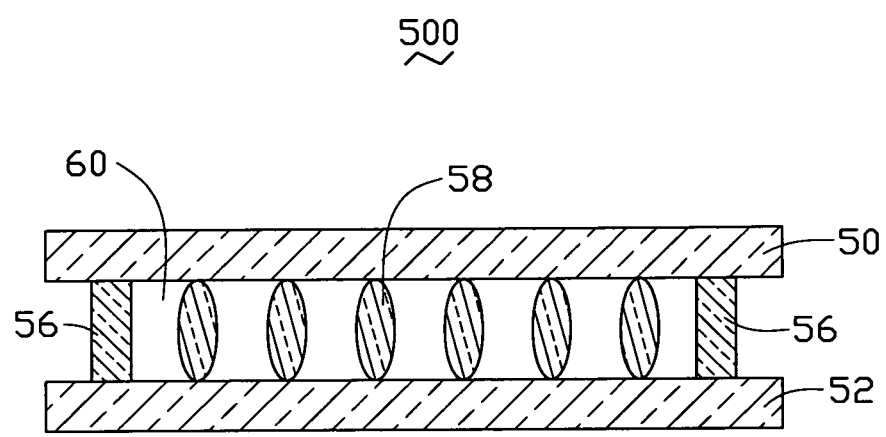
FIG. 3 is a schematic view of a typical solar collector according to the prior art.

Referring to FIGS. 1-2, a solar heating system 100 according to a first embodiment is shown. The solar heating system 100 includes a solar collector 10 and a storage apparatus 20 connected to the solar collector 10. The storage apparatus 20 is configured for storing heat generated by the solar collector 10.

The solar collector 10 includes a substrate 11, a sidewall 12, a transparent cover 13, a heat-absorbing layer 14 and a number of supporters 15. The substrate 11 has a top surface 111 and a bottom surface 112 opposite to the top surface 111. The transparent cover 13 has a bottom surface 131. The sidewall 12 is mounted on the periphery of the top surface 111 of the substrate 11. The transparent cover 13 is attached on the sidewall 12 opposite to the substrate 11 to form a sealed chamber 16 in cooperation with the sidewall 12 and the substrate 11. The heat-absorbing layer 14 is disposed on the top surface 111 of the substrate 11 and received in the sealed chamber 16.

The material of the substrate 11 can be selected from one of heat-conducting materials, such as metal, glass, polymer, and so on. A thickness of the substrate 11 can be in a range from about 100 μm to about 5 mm. The shape of the substrate 11 is not limited; and may be triangular, hexagonal, and so on.

The transparent cover 13 may be a solar radiation access window. The material of the transparent cover 13 can be selected from a group consisting of glass, plastic, transparent porcelain, polymer and other transparent materials. A thickness of the transparent cover 13 can be in a range from about 100 μm to about 5 mm. The shape of the transparent cover 13 is not limited, and may be triangle, hexagon, quadrangle, and so on.

The sidewall 12 is configured for supporting the transparent cover 13, and then formed the sealed chamber 16 between the transparent cover 13 and the substrate 11. The sidewall 12 is made of materials selected from glass, plastics, polymers, and the like. A height of the sidewall 12 is not limited. A thickness of the sidewall 12 can be in a range from about 100 μm to about 500 μm. In the present embodiment, the range is 150 μm to 250 μm.

The sealed chamber 16 may be a vacuum chamber or an atmospheric chamber filled with thermal-insulating materials. In the present embodiment, the sealed chamber 16 is an atmospheric chamber, and the thermal-insulating materials filled therein can be transparent or translucent foam materials, such as transparent foam rubber, transparent foam plastics, or the like. The sealed chamber 16 can also be filled with thermal-insulating gas, such as nitrogen, and/or inert gases.

The heat-absorbing layer 14 includes a carbon nanotube composite material. The carbon nanotube composite material includes at least one dark material and a plurality of carbon nanotubes. The dark material is selected from light absorbing materials, such as carbon or graphite. The carbon nanotubes are distributed uniformly in the carbon nanotube composite material. The carbon nanotubes are arranged orderly or disorderly in the carbon nanotube composite material. The ordered carbon nanotubes are primarily oriented along a same direction. The disordered carbon nanotubes are entangled with each other or distribute randomly. The weight percentage of the carbon nanotubes in the carbon nanotube composite material ranges from about 80% to about 99%. A thickness of the carbon nanotube composite material is in a range from about 0.1 μm to about 2 centimeters, but not limited to this.

The carbon nanotubes of the carbon nanotube composite material may be selected from a group consisting of single-walled carbon nanotubes, double-walled carbon nanotubes, multi-walled carbon nanotubes, and their combinations. The carbon nanotube have diameters in a ranged from about 0.5 to about 50 nm and length more than 10 μm. In the present embodiment, the carbon nanotube each has a length in a range from 100 μm to 1 mm.

The supporters 15 are configured for increasing the strength of the solar collector 10. The supporters 15 are dispersed in the sealed chamber 16 at random or in a desired pattern. The supporters 15 are spaced from each other and disposed between the substrate 11 and the transparent cover 13. The supporters 15 are made of thermal-insulating materials, such as glass, plastics, rubber, and so on. A height of the supporters 15 is the same as that of the sidewall 12 for contacting with the transparent cover 13. The shape of the supporters 15 is not limited, and may be, for example, rounded or bar-shaped.

The solar collector 10 further includes a reflection layer 17. The reflection layer 17 is disposed on the bottom surface 131 of the transparent cover 13. The reflection layer 17 is configured for allowing the visible light and near infrared light of the sunlight passing through the transparent cover 13 and trap the reflecting the far infrared light radiated from the heat-absorbing layer 14. Thus, preventing thermal radiation from escaping the sealed chamber 16. Thus, the light absorbing efficiency of the solar collector 10 is improved. The reflection layer 17 may be an indium tin oxide (ITO) film or a titanium dioxide film and a thickness of the reflection layer 17 ranges from about 10 nm to about 1 μm.

The storage apparatus 20 is located on a bottom surface 112 of the substrate 11 and may include a number of pipes (not shown) filled with circulating fluid. The fluid may be selected from the group of water, glycol, or the like.

In use, since the carbon nanotube film is black and has a capability of absorbing most heat of the solar spectrum. The sunlight travels through the transparent cover 13 and reaches the heat-absorbing layer 14. A good portion of the radiation of the sunlight is absorbed by the heat-absorbing layer 14. Then, the heat absorbed by the heat-absorbing layer 14 is conducted to the storage apparatus 20 via the substrate 11. Therefore, the solar collector 10 has a high efficiency because of the excellent light absorbing and transfer properties of the carbon nanotubes of the heat-absorbing layer 14. The solar collector 10 is durable due to the toughness of the carbon nanotubes in the carbon nanotube film. The use of carbon nanotube, which does not oxidize easily, eliminates the need for a high vacuum. This significantly reduces the cost and further increases the durability of the solar collector 10.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A solar heating system comprising:
 a solar collector comprising:
  a substrate having a top surface;
  a sidewall;
  a transparent cover comprising a reflection layer on at least one surface of the transparent cover, the transparent cover being disposed on the sidewall with the reflection layer facing the substrate; the substrate, the sidewall and the transparent cover are hermetically connected with each other to form a chamber which is sealed; and
  a heat-absorbing layer disposed inside the chamber and facing the reflection layer, the heat-absorbing layer comprising a carbon nanotube composite material, wherein the reflection layer is configured to reflect a far infrared light radiated from the heat-absorbing layer; and
 a heat storage apparatus connected to the substrate and configured for storing heat generated by the solar collector.

2. The solar heating system as claimed in claim 1, wherein the chamber has a pressure equal to an atmospheric pressure.

3. A solar collector comprising:
 a substrate comprising a top surface and a bottom surface opposite to the top surface;
 a sidewall arranged on the top surface of the substrate;
 a transparent cover attached to the sidewall;
 a reflection layer disposed on a surface of the transparent cover;
 a chamber formed by the transparent cover comprising the reflection layer, the sidewall, and the substrate, the reflective layer being inside of the chamber; the chamber has a pressure equal to an atmospheric pressure when the chamber is sealed; and the chamber is filled with thermal-insulating materials, the thermal-insulating materials being transparent or translucent foam materials; and
 a heat-absorbing layer located in the chamber, the heat-absorbing layer comprising a carbon nanotube composite material, wherein the reflection layer and the heat-absorbing layer face each other, the reflection layer is configured to reflect a far infrared light radiated from the heat-absorbing layer.

4. The solar collector as claimed in claim 3, wherein the chamber is filled with thermal-insulating gas comprising a gas selected form the group consisting of nitrogen and inert gases.

5. The solar collector as claimed in claim 3, wherein the carbon nanotube composite material comprises at least one dark material and a plurality of carbon nanotubes, and the at least one dark material is selected from the group consisting of carbon and graphite.

6. The solar collector as claimed in claim 5, wherein a percentage by mass of the plurality of carbon nanotubes in the carbon nanotube composite material is in a range from about 80% to about 99%.

7. The solar collector as claimed in claim 3, wherein a thickness of the reflection layer is in a range from about 10 nm to about 1 μm.

8. The solar collector as claimed in claim 3, wherein the heat-absorbing layer is located on the top surface of the substrate and faces the reflecting layer.

9. The solar collector as claimed in claim 3, wherein the transparent cover is made a material selected from a group consisting of glass, plastic, transparent porcelain, and polymer.

10. The solar collector as claimed in claim 3, wherein a thickness of the transparent cover is in a range from 100 μm to 5 mm.

11. The solar collector as claimed in claim 3, wherein the substrate is made of material selected from the group consisting of metal, glass, and polymer.

12. The solar collector as claimed in claim 11, wherein a thickness of the substrate is in a range from 100 μm to 5 mm.

13. The solar collector as claimed in claim 3, wherein the sidewall is made of glass, and a height of the sidewall is in a range from 100 μm to 500 μm.

14. The solar collector as claimed in claim 3, wherein the reflection layer and the heat-absorbing layer are both located in the chamber.

* * * * *